United States Patent [19]

Schenck

[11] 4,024,966
[45] May 24, 1977

[54] AUTOMATIC SLIDE MAGAZINE HANDLER

[76] Inventor: Paul F. Schenck, 1934 Miramonte Ave., Mountain View, Calif. 94040

[22] Filed: June 13, 1975

[21] Appl. No.: 586,551

[52] U.S. Cl. .................................. 214/7; 353/112; 353/DIG. 1
[51] Int. Cl.² ......................................... B65G 57/00
[58] Field of Search ...................... 214/301, 307, 7; 353/112, 113, DIG. 1

[56] References Cited

UNITED STATES PATENTS

| | | |
|---|---|---|
| 3,308,718 | 3/1967 | Antos ................................. 353/112 |
| 3,591,275 | 7/1971 | Badalich et al. ................... 353/113 |
| 3,773,413 | 11/1973 | Costanza et al. .................. 353/112 |
| 3,858,970 | 1/1975 | Collier ............................... 353/113 |

Primary Examiner—Robert J. Spar
Assistant Examiner—Ross Weaver
Attorney, Agent, or Firm—Paul F. Schenck

[57] ABSTRACT

A photographic slide magazine is placed on a hub and rotates around its axis while the compartments containing slides pass over an opening through which the slides drop into a receiver. After unloading previously stored slides each compartment passes under a loading mechanism, which drops another slide into each of the emptied compartments. Loading and unloading operations are concurrent. A storage magazine with a clamping mechanism is used to pick-up the unloaded slides and to place slides in the loading mechanism.

3 Claims, 10 Drawing Figures

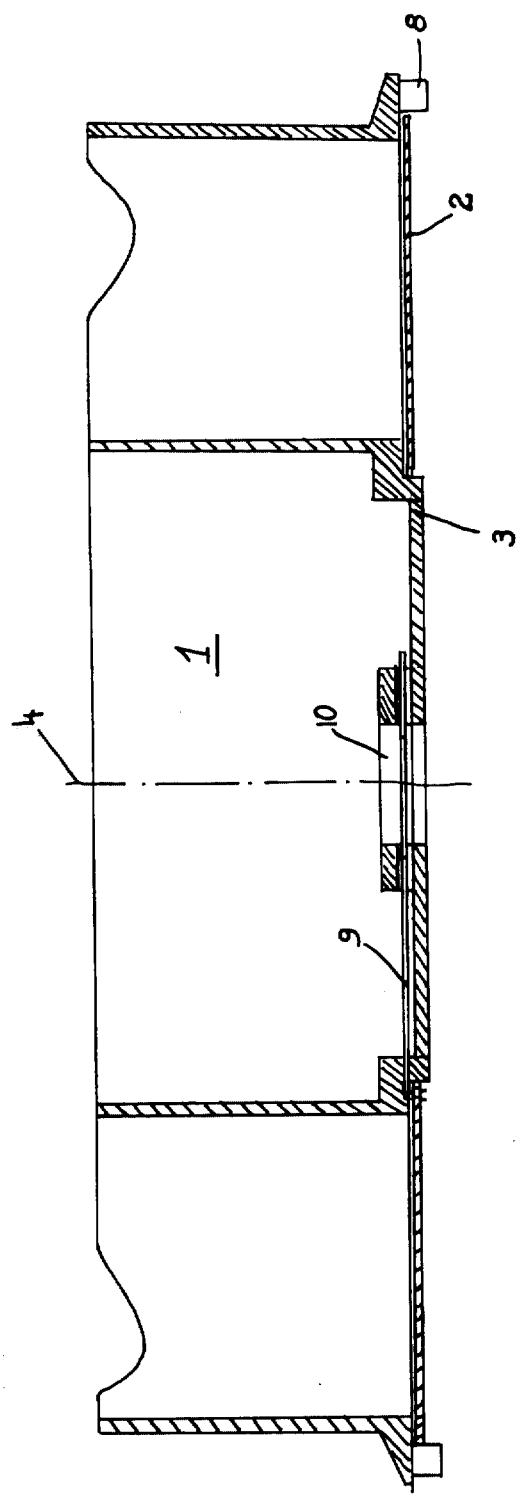

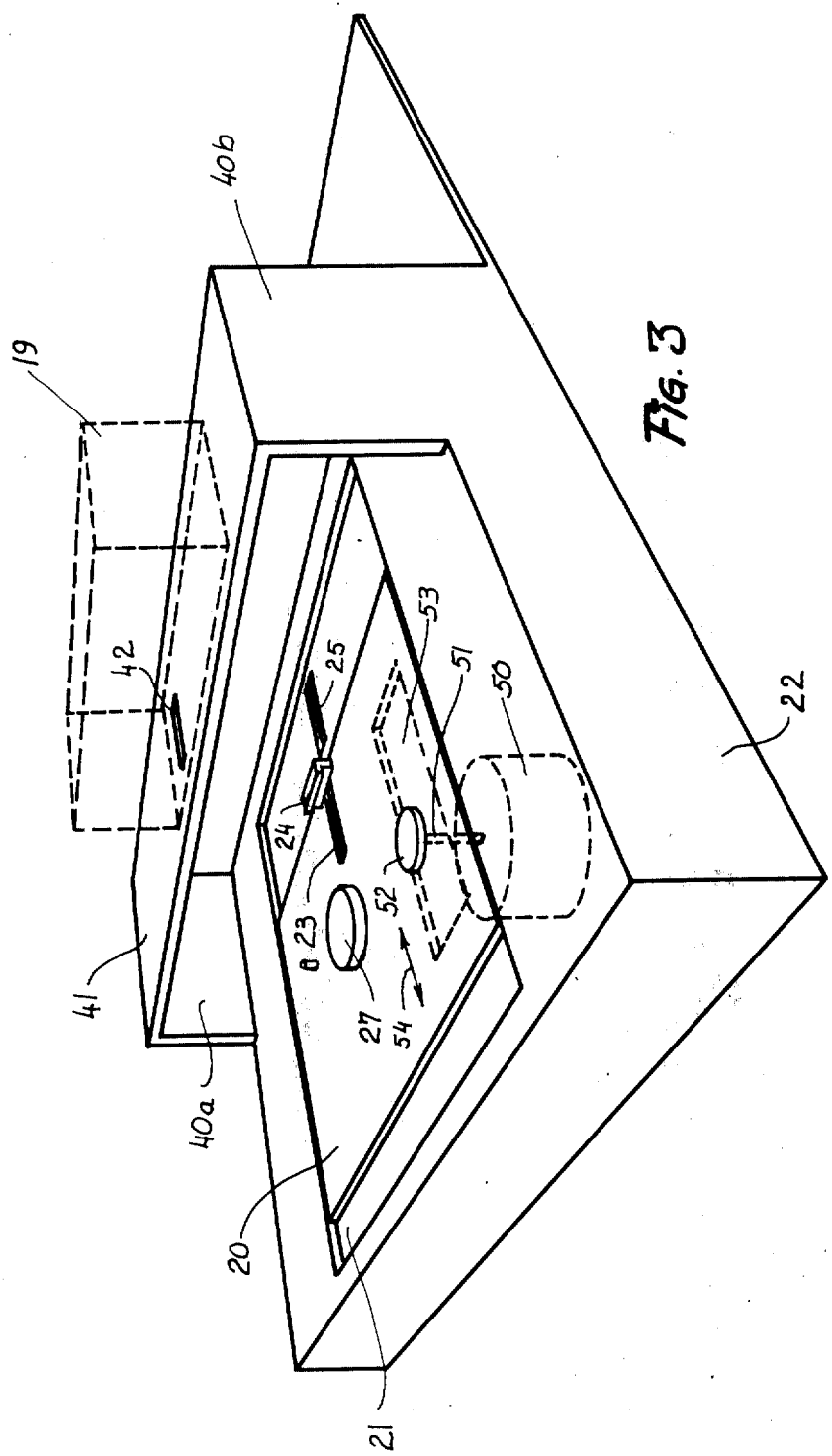

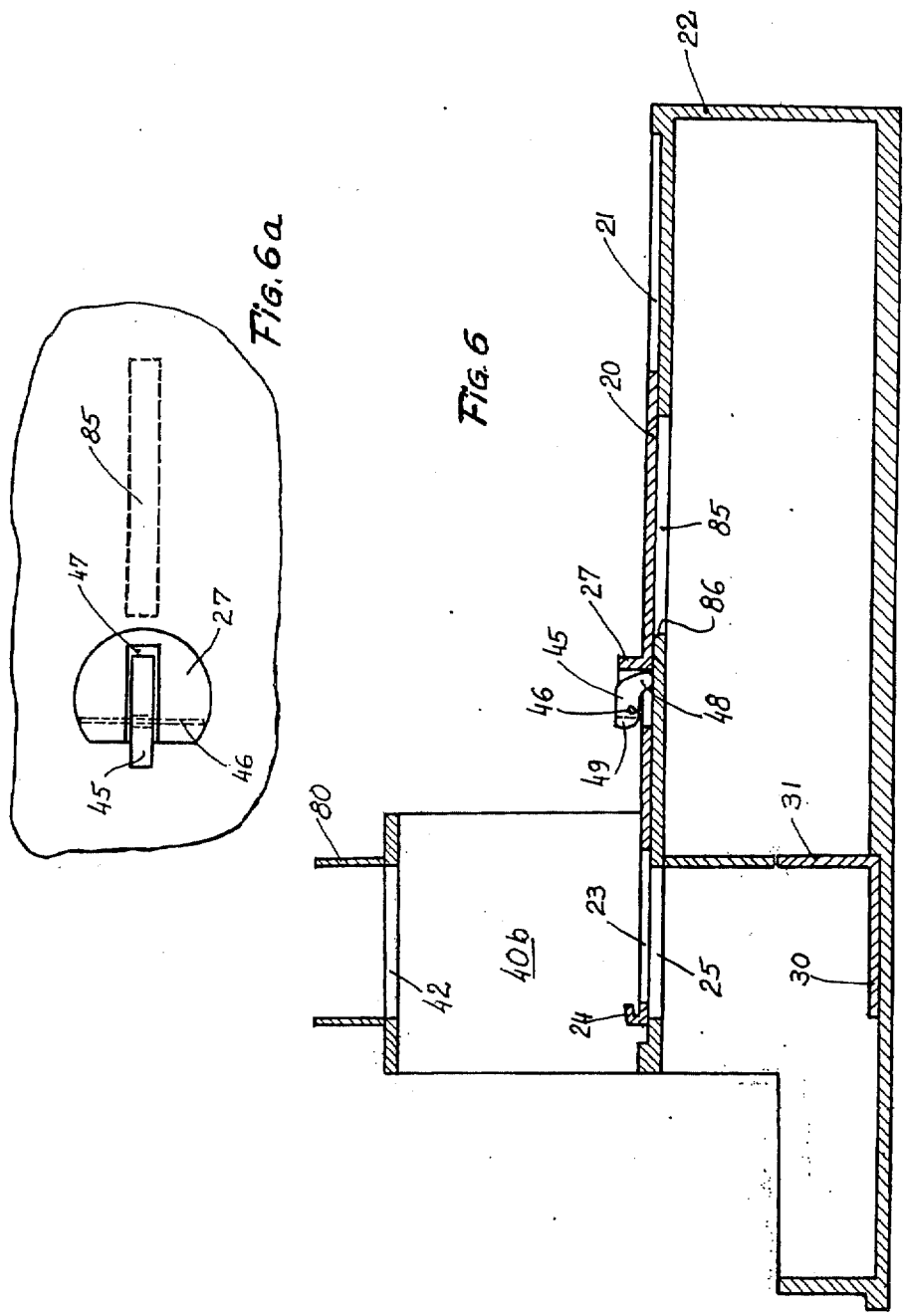

AUTOMATIC SLIDE MAGAZINE HANDLER

BACKGROUND OF THE INVENTION

Certain types of photographic slide projectors use circular slide magazines, which can be loaded with slides from the top, while when placed on the projector the slides are transferred to and from the projector through the bottom of the magazine. Circular slide magazines are good working storages for photographic slides, but present an inefficient method for storing slides. Using an arrangement for easy transfer between an efficient storage magazine and a convenient circular slide magazine combines small storage space with easy access to individual slides during presentations.

SUMMARY OF THE INVENTION

It is an object of this invention to simplify loading and unloading of slide magazines.

It is another object of this invention to automate loading and unloading of slide magazines.

It is another object of this invention to provide for concurrent unloading of one set of slides and loading of another set of slides.

It is still another object of this invention to increase storage efficiency for photographic slides with a new type of storage magazine.

It is still another object of the invention to provide for an easy transfer of slides from a storage magazine to a projector magazine and vice versa.

BRIEF DESCRIPTION OF THE DRAWINGS

FIG. 1 is a cross-section of a circular slide magazine.
FIGS. 3 and 4 are perspective views of the slide handler.
FIG. 6 is a sectional view of the slide magazine handler without a slide magazine placed on the carrier plate.
FIG. 6A is a detail view of the lever assembly for preventing the bottom plate from turning when a slide magazine is not in the handler.

DESCRIPTION OF THE INVENTION

Figure 2A:
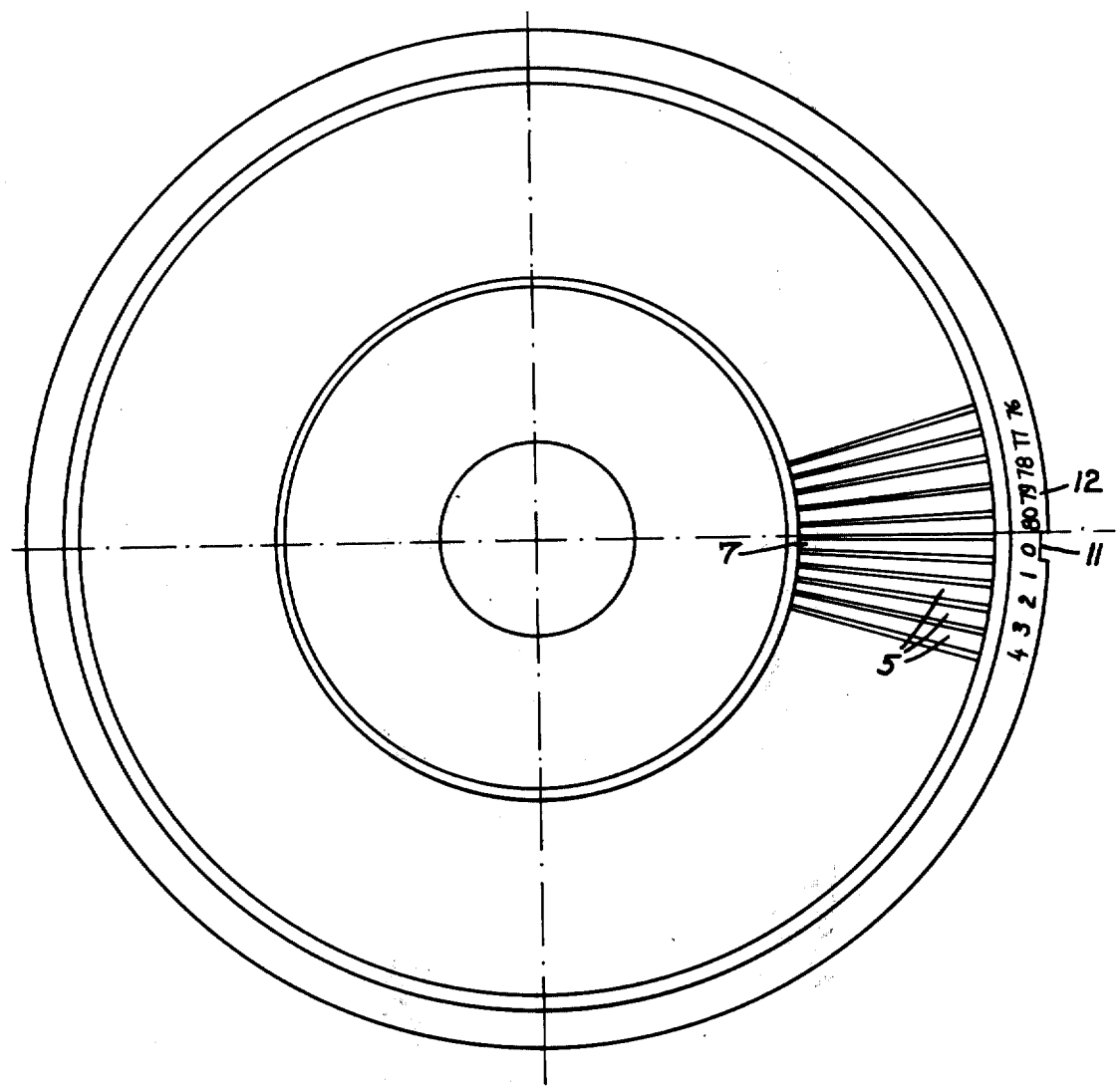
FIG. 2A is a top view of a circular slide magazine.

Certain types of photographic slide projectors make use of slide magazines as working storage and as permanent storage. Such magazines store slides in compartments from which the slides can easily be moved into the projector for projection, and to which the slides return afterwards. Other projectors have stack loaders which accept slides in stacks. The later type of projectors have a mechanism for selecting the top or next slide in sequence for projection. Stack loaders operate sequential in one direction only. Stack loaders do not provide for reversal of the sequence of operation, nor do they provide for selective projection at random. Stack loaders do not require magazines for operation, and slides can be stored in any convenient boxes.

The present invention provides for easy transfer of slides between containers for storing slides and circular slide magazines for presenting slides by means of a suitable projector. The arrangement of the present invention combines the high storage efficiency of a simple storage box with the random accessibility to slides as provided by a circular slide magazine. The principles of the invention are applicable to straight as well as to circular magazines.

It is understood that not all magazines allow concurrent unloading of a first set of slides and loading of a second set of slides. Each of the arrangements for unloading slides as well as for loading slides can be used separately and independently.

DESCRIPTION OF THE PREFERRED ENBODIMENT

FIG. 1 is a cross-section of a circular slide magazine 1. In the arrangement of the present invention such a circular slide magazine is automatically unloaded and reloaded in one operation. The slide magazine depicted in FIG. 1 is of the type used in KODAK CAROUSSEL slide projectors. Such magazines are subdivided in compartments 5, each of which may contain one slide. The magazine 1 has a bottom plate 2 movably connected to the magazine main body 3. Bottom plate 2 can rotate relative to the main body 3 of magazine 1 around common axis 4. Bottom plate 2 has an opening 14 of the size of the cross-section of a compartment 5. By rotating bottom plate 2 relative to main body 3 of magazine 1 opening 14 will pass sequentially each of the slide compartments 5 and allow the stored slide to drop through opening 14. Slide magazine 1 includes a "zero" compartment 7 which cannot be loaded with a slide. If bottom plate 2 is positioned with its opening 14 under "zero" compartment 7, a key 9 locks in and prevents further movement of bottom plate 2, until key 9 is released. Bottom plate release key 9 can be operated from the center 10 of magazine 1.

Figure 2B:
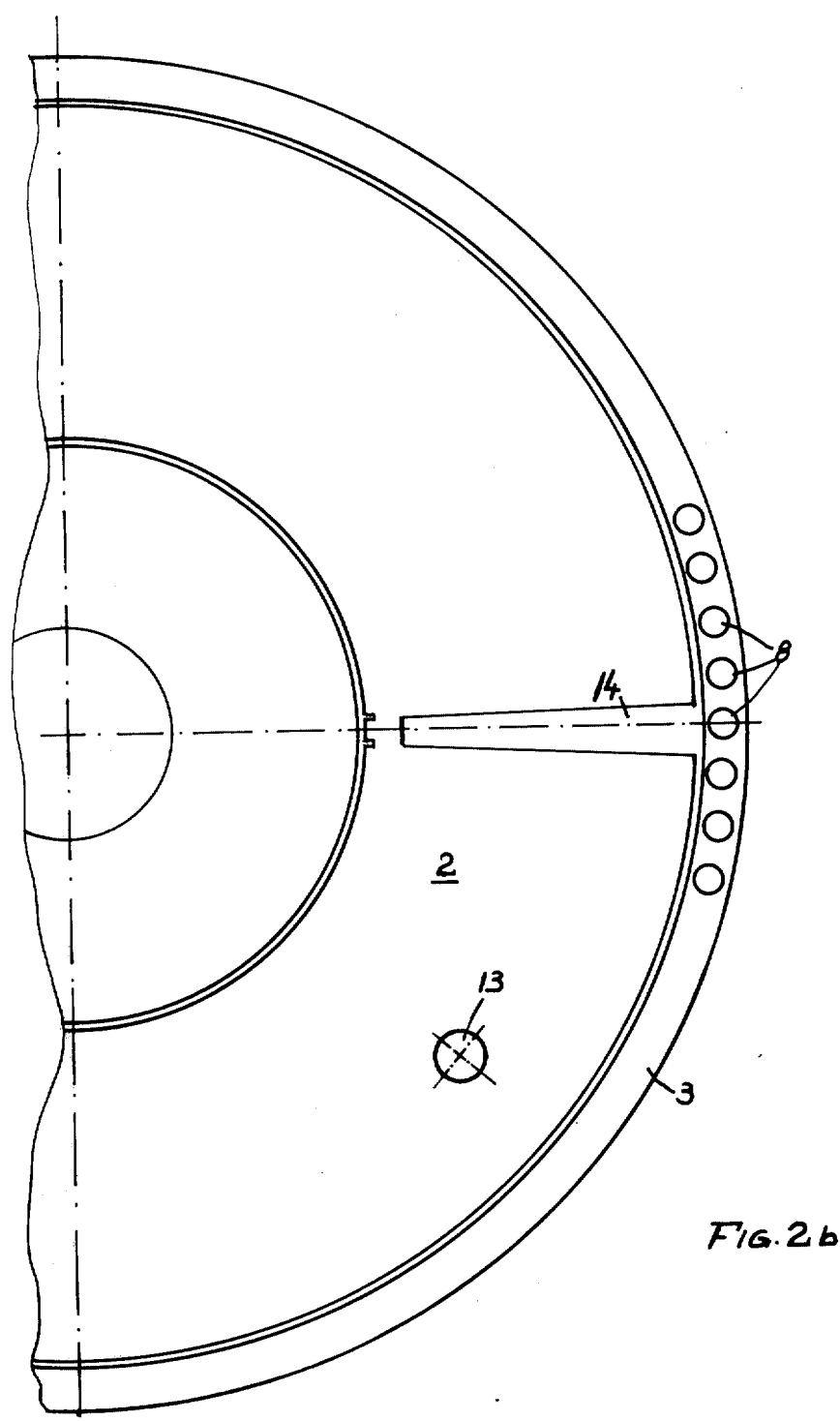
FIG. 2b is a bottom view of a circular slide magazine.

FIG. 2 is a top view of a circular slide magazine 1. For proper placement of circular slide magazine 1 on a projector or on the automatic slide handler the magazine main body 3 has a recess 11 in the outer rim 12. Furthermore bottom plate 2 has an index hole 13 to ensure proper relative movement between magazine main body 3 and bottom plate 2 when operated on a projector or a slide handler of the present invention. Both the recess 11 in the outer rim 12 of main body 3 and the index hole 13 in bottom plate 2 are examplatory means and can be replaced by other means performing the same function without reducing or enlarging the scope of the present invention.

Figure 4:
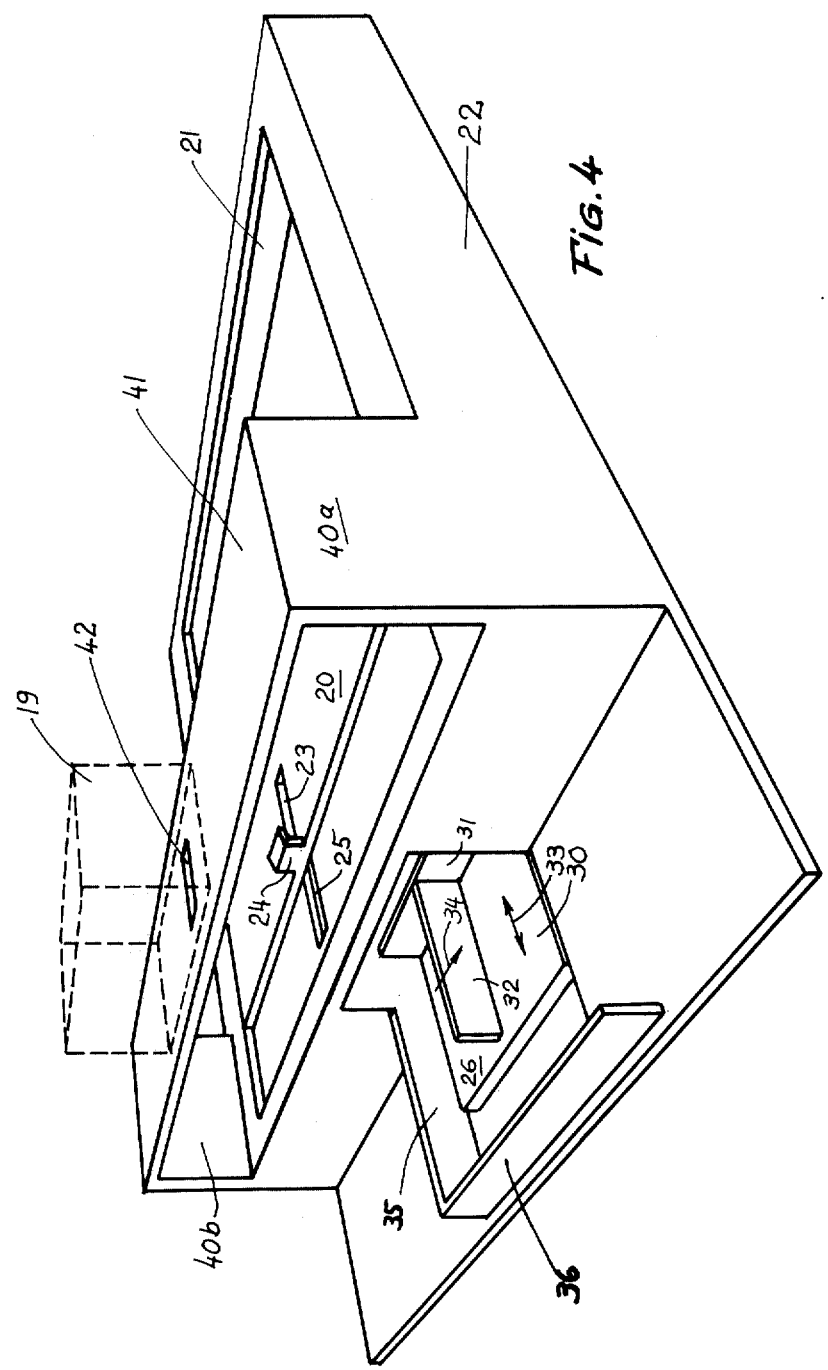

FIGS. 3 and 4 are perspective views of the slide handler. FIGS. 3 and 4 include only the essential parts of the slide handler for understanding of its features and principles of operation. More details of important sections of the handler are illustrated on successive figures.

For loading and/or unloading of slides, the slide magazine 1 is placed on carrier plate 20. Carrier plate 20 is slidably mounted in a recess 21 of a box like base 22. Plate 20 has an opening 23 of sufficient size for a slide to pass through. An index pin 29 in carrier plate 20 ensures that opening 14 of bottom plate 2 matches with opening 23 in carrier plate 20 when a magazine 1 is placed on carrier plate 20 for slide handling. Carrier plate 20 has a register 24 which has to match with the recess 11 in the outer rim 12 of slide magazine 1. Both the index pin 29 and the register 24 of the carrier plate 2 ensure that the slide magazine 1 can only be removed from carrier plate 20 if the opening 14 in bottom plate 2 is located under "zero" compartment 7 of slide magazine 1.

Carrier plate 20 can be moved to the rear of the handler for placing a magazine on it or for removing a magazine from carrier plate 20. For unloading and/or loading of slides the carrier plate 20 is moved into most forward position. In forward position opening 14 in bottom plate 2 and opening 23 in carrier plate 20 match up with opening 25 in the recessed area 21 of base 22. Openings 14, 23 and 25 form a chute 28 through which slides can drop out of their compartments into slide assembler 26. By rotating the main body 3 of magazine 1 around center hub 27 of carrier plate 20 each of the compartments of slide magazine 1 passes over drop chute 28. Slides stored in these compartments will drop through chute 28 and are assembled in the same sequence as they were stored in the compartments of magazine 1.

Slide assembler 26 consists of a plate 30 with a fixed wall 31 and a slide stop 32. Slide stop 32 is movably connected to plate 31, as indicated by arrow 34. Plate 30 including wall 31 and slide stop 32 can be moved out of base 22 as indicated by arrow 33. While unloading slides from a magazine 1 slide assembler 26 is positioned under chute 28. Slides dropping through chute 28 are assembled in upright position, leaning against slide stop 32. More detail information on slide assembler 26 are given on FIG. 5. After completing an unloading operation slide assembler 26 is moved out of base 22. Slides assembled on plate 30 remain in upright position guided by slide stop 32 and wall 35. As the assembler 32 reaches its most forward position all assembled slides are aligned between walls 31 and 36. Slides on the slide assembler 26 can be pressed to a compact stack by moving slide stop 32 in opposite direction of arrow 34. The assembled and compressed slide stack can be removed by hand or by use of a storage magazine with a clamping feature as shown on and described relative to FIG. 7.

For loading slides into compartments of a slide magazine a slide loader 19 is affixed by spacers 40a and 40b to a bridge like support 41 over the slide magazine. Bridge plate 41 has an opening 42 through which slides can be dropped into compartments of the slide magazine. The slide loader can be of similar construction as found with stack loaders for KODAK projectors. Of cause only the loading section of such a stack loader device is necessary in the handler of the present invention. Stack loader 19 is positioned on bridge plate 41 in such a position as to enable it to supply individual slides through opening 42 into a compartment of a slide magazine 1 positioned under opening 42. Opening 42 is offset relative to openings 14, 23 and 25 in bottom plate 2, respectively carrier plate 26, respectively base 22 by the width of at least one compartment.

A motor 50 for rotating the slide magazine on carrier plate 20 is mounted under carrier plate 20 and affixed to the same. Motor drive shaft 51 reaches through carrier plate 20 and carries a gear or drive wheel 52 for engagement with the slide magazine and rotating the slide magazine around center hub 27. An opening 53 in the recessed section of base 22 is provided to allow free movement of carrier plate 20 with motor 50 in the directions of arrow 54.

Figure 5A:
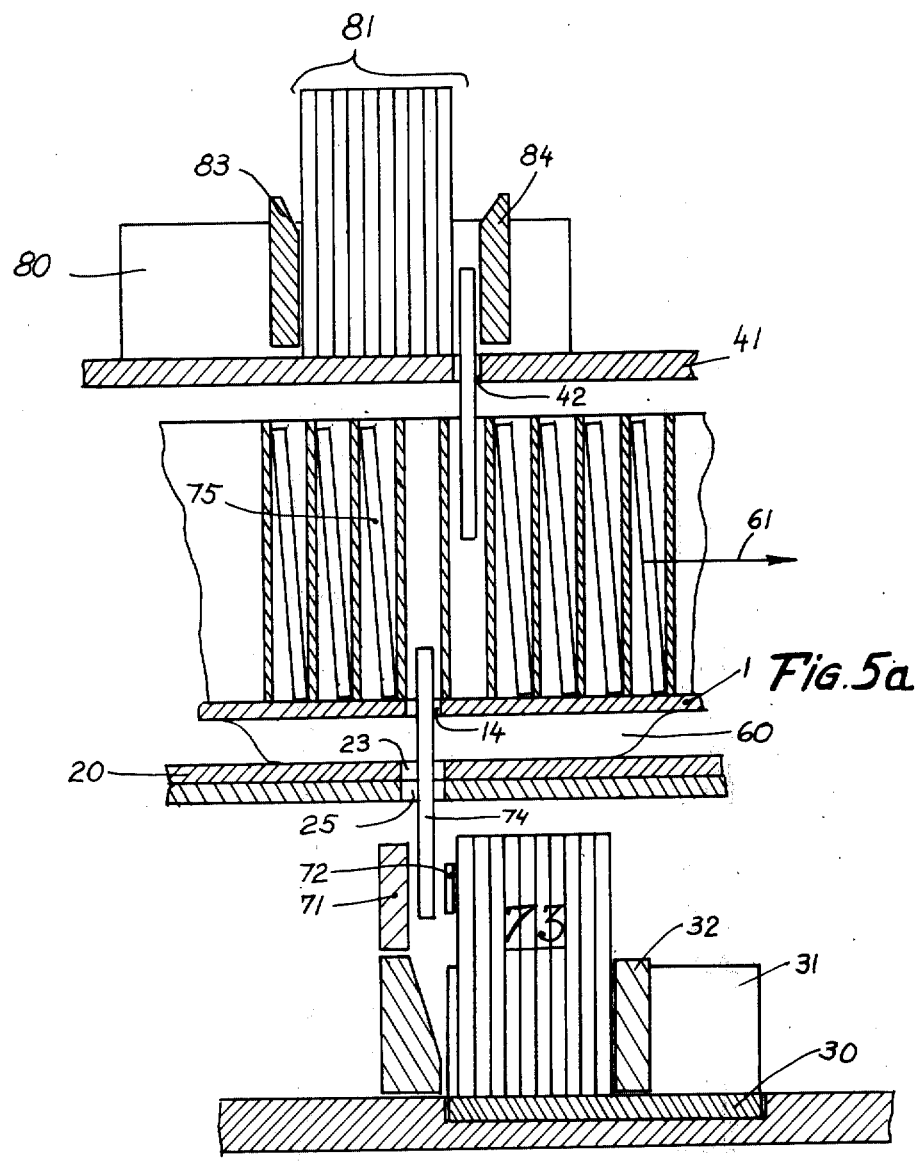
FIG. 5A is an illustration of the unloading and loading mechanism in the slide handler.

FIG. 5a is a schematic illustration of the unloading and loading operation in the slide handler of the present invention. Slide magazine 1 rests with its center support section 60 on carrier plate 20. Openings 14, 23, and 25 in bottom plate 2, respectively carrier plate 20, respectively base 22 as well as opening 42 in bridge plate 41 are aligned with the respective compartments in magazine 1. Each time slide magazine 1 is moved in the direction of arrow 61 by the width of one compartment a slide stored in the compartment passing over openings 14, 23, and 25 will drop into slide assembler 26. A slide mover 71 will move the newly arrived slide to the right until it is locked behind key 72. All previously assembled slides 73 and slide stop 32 move to the right by a corresponding distance. Slide mover 71 returns to its normal position, which is shown on FIG. 5, to allow another slide to drop into assembler 26. Slide stop 32 is movably connected to plate 30 and rear wall 31 of slide assembler 26. FIG. 5 depicts the moment when slide 74 is dropping through openings 14, 23, and 25. After completion of unloading slide 74 into slide assembler 26 magazine 1 is advanced and the next compartment can unload its slide 75 through openings 14, 23, and 25 into the assembler 26.

As can be seen on FIG. 5a opening 14 has the width of one compartment. Thus as the magazine 1 advances, new slides can be placed in the compartments which have passed opening 14 and unloaded their stored slides. To load slides into emptied compartments of magazine 1 drop chute 42 of loading mechanism 19 is offset relative to drop chute 28 of the unloading arrangement by one compartment. In FIG. 5a only the basic parts of the loading mechanism are indicated. There are various types of loading mechanism known, which may be employed to fulfill this function. Side wall 80, guiding slides 81 during loading to drop chute 42, pressure plate 83, advancing slides 81 to drop chute 42 and release plate 84, controlling the sequential release of slides into compartments of magazine 1 are the main elements of such a loading mechanism 19.

The operation of the slide handler of the present invention can be fully automatic, semi-automatic or manual controlled. In the fully automatic version motor 50 moves slide magazine 1 at a constant speed, sufficiently slow to allow each slide stored in a compartment of magazine 1 to drop through chute 28 into slide assembler 26, and to allow different slides to drop from the loading mechanism into emptied compartments by force of gravity. Release plate 84 is operated when the magazine has placed a compartment under opening 42. Slide mover 71 is operated as soon as magazine 1 has left an unloading position. Proper drop of slides into assembler 26 and into empty compartments is supervised by optical means, light source and light sensor across the path of slides when moving in and out of compartments. Any movement of the magazine 1 will be terminated before a slide can be jammed in its path.

Figure 5B:
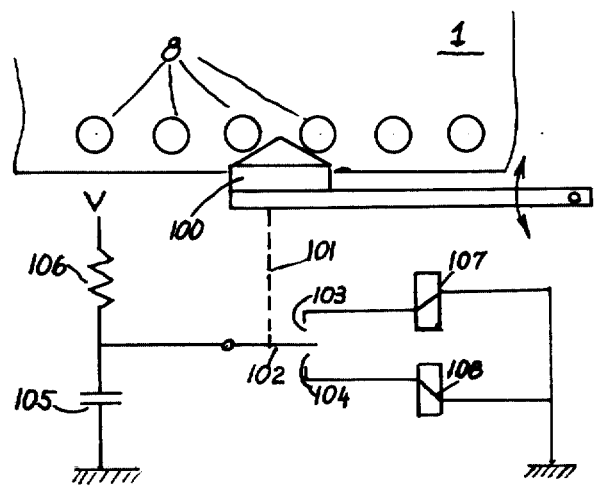
FIG. 5b is a schematic of the circuit for controlling the rotation of the magazine in the handler.

As indicated on FIG. 3 a motor 50 can be used to rotate a magazine 1 placed on plate 20 around center hub 27, whereby the compartments pass both the unloading and the loading positions, to drop a previously received slide into slide assembler 26 and to receive a different slide through opening 42. To initiate operation of slide assembler 26, especially slide mover 71 for stacking a just received slide behind key 72, and to release a different slide from loader 19 by actuation of release plate 84 the position of magazine 1 relative to the openings 23, 25, and 42 is sensed by feeler 100. In FIG. 5b feeler 100 is coupled by link 101 to switch 102. Switch 102 will close contact 103 if feeler 100 rides on one of the sprockets 8 at the outer rim of magazine 1

(FIG. 5b presents an elongated view). There is one sprocket 8 for each of the compartments of a slide magazine. Switch 102 will close contact 104 if feeler 100 sits between two sprockets 8. Contact 103 closes an electric path from capacitor 105 and resistor 106 to magnet 107, which operates slide mover 71 if energized. Contact 104 closes an electric path from capacitor 105 and resistor 106 to magnet 108, which in energized state will operate release plate 84. Thus by rotating magazine 1 around center hub 20, magnets 107 and 108 are energized alternately and in synchronism with the movement of magazine 1. Capacitor 105 is recharged through resistor 106 while feeler 100 is moved from either one of its terminal positions to the other one. Capacitor 105 provides energy for fast action and energization of magnets 107 and 108.

FIG. 6 is a sectional view of the slide magazine handler without a slide magazine placed on carrier plate 20. Carrier plate 20 is movable in recess 21 of base 22. The center hub 27 has a lever 45 which can be turned around its shaft 46 within the space provided by slot 47 in center hub 27 and the opening 85 in the top of base 22. The purpose of lever 45 is to operate the key 9 which prevents bottom plate 2 from turning while the slide magazine 1 is not on the slide magazine handler or in use on a projector. When carrier plate 20 is moved into its forward position on base 22 lever 45 is turning counterclockwise as soon as the extension 48 of lever 45, hanging through slot 47 of carrier plate 20 and opening 85 of base plate 22, hits corner 86 in base plate opening 85. The upper end of lever 45 will force key release 9 of magazine 1 forward and allow bottom plate 2 to rotate relative to magazine main body 3.

Figure 7:
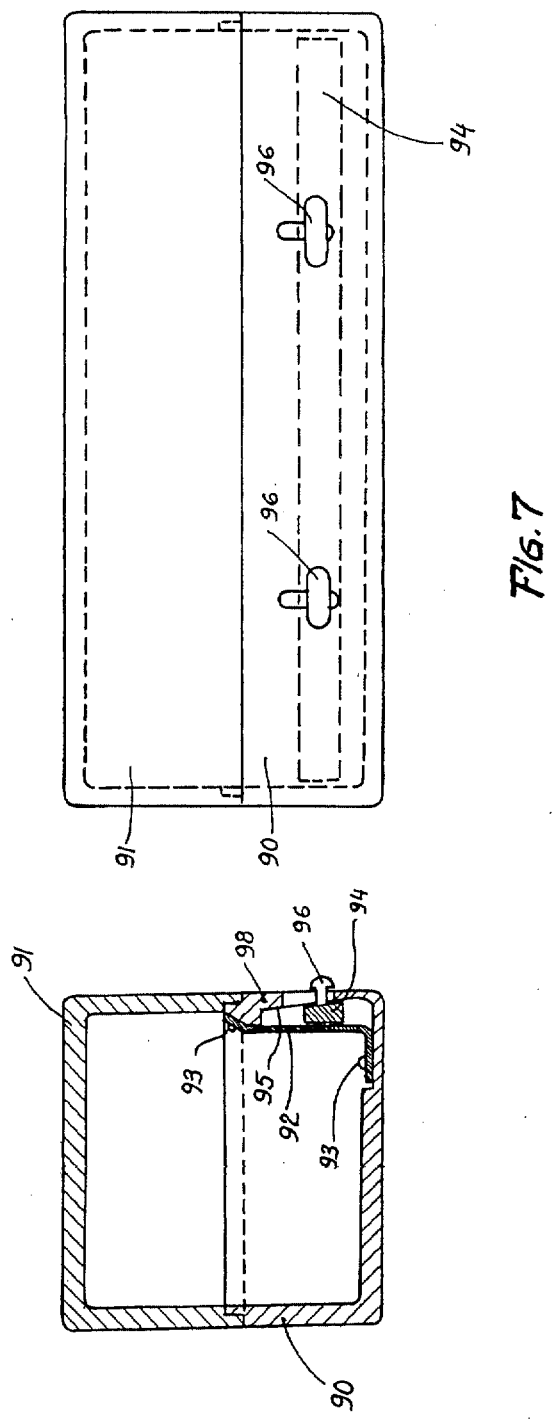
FIG. 7 is a illustration of a new type of slide storage container.

FIG. 7 is a schematic illustration of a new type of slide storage container. It consists of a bottom part 90 and a cover 91. Cover 91 has only protective purposes. Bottom part 90 includes a slide clamp 92, which allows to place the bottom part 90 in an upside down position over a stack of slides, apply the clamp and lift the slides up. This feature provides for lifting a stack of slides out of the slide assembler and for placing a stack of slides in the slide loader. Clamp 92 includes a soft plastic material affixed to the bottom part 90 by rivets 93 or cemented to it providing a permanent connection. A wedge 94 is movably affixed to bottom part 90 between its inner wall 95 and the plastic material 92. Wedge 94 can be moved up and down by handles 96. When moved towards its upper position, wedge 94 will press clamp 92 against the slides placed in the container, thereby clamping the slides between the plastic material 92 and the opposite wall 97 of bottom part 90. The counter wedge for the clamping effect can be wall 98 of bottom part 90 or the plastic material itself if the same is made of gradually increasing thickness. To keep slide stored in this new type of container from turning when clamped, the plastic material as well as the opposite wall 97 are grooved parallel to the edges of the slides.

What I claim is:

1. An arrangement for loading and unloading slide magazines having compartments for storing slides, comprising, in combination:
   a slide magazine carrier plate;
   a slide magazine, removably mounted on said slide magazine carrier plate;
   a controlled drive for moving said slide magazine on said slide magazine carrier plate;
   a magazine register guiding said slide magazine during movement on said carrier plate;
   a slide assembler for stacking slides received from said slide magazine;
   slide supply means for supplying different slides to said slide magazine;
   said slide magazine carrier plate including an opening for transferring said slides from said compartments to said slide assembler;
   said slide supply means including
   a support plate,
   a store for stacked slides,
   a slide release, and
   an opening for transferring released ones of said stacked slides from said store to said compartments of said slide magazine;
   spacers connected between said slide magazine carrier plate and said support plate for providing space for moving said slide magazine between said carrier plate and said support plate;
   control means connected to and coordinating operation of said slide assembler, said slide release, and said controlled drive, whereby each of said compartments successively passes said opening in said slide magazine carrier plate for transferring a stored one of said slides to said slide assembler, and said opening in said support plate for transferring a released one of said stacked slides from said store to said slide magazine; and
   positioning means for placing said slide magazine in a locked position for unloading and loading of said slides, and in an unlocked position for exchanging said slide magazine.

2. An arrangement as set forth in claim 1, wherein said positioning means include
   a positioning plate slidably mounted on said slide magazine carrier plate, and having a first position for unloading and loading of said slides and a second position for exchanging said slide magazine.

3. An arrangement as set forth in claim 1 for loading and unloading circular slide magazines having a rotatable bottom plate and a key for locking said bottom plate in a predetermined position, further comprising:
   a center post for guiding said circular slide magazine during rotational movement;
   a shaft; and
   a lever movably mounted at said center post around said shaft and coupled to said positioning means for releasing said key during said rotational movement of said slide magazine on said carrier plate in said locked position.

* * * * *